UNITED STATES PATENT OFFICE.

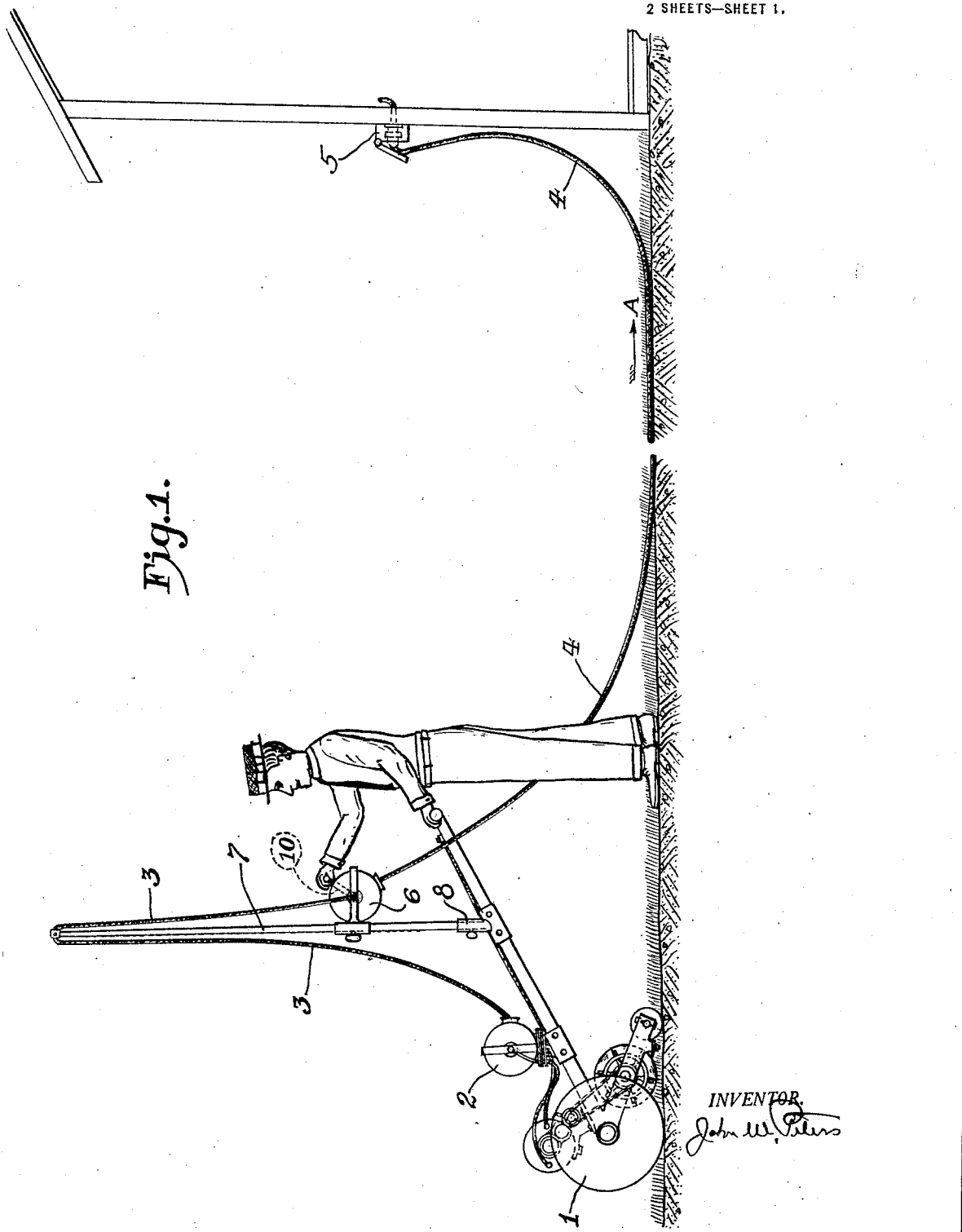

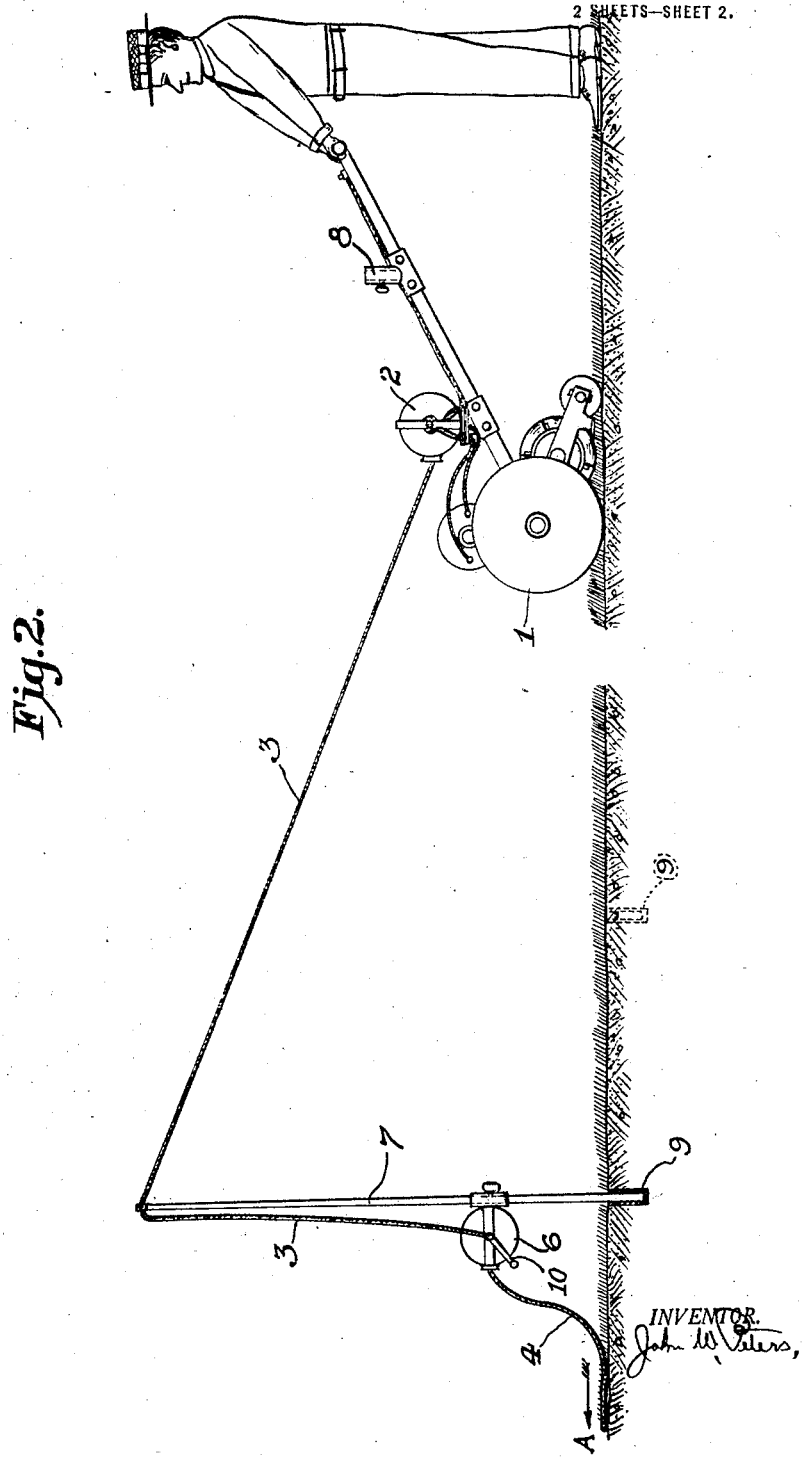

JOHN W. PETERS, OF ROSLYN, NEW YORK.

LAWN MOWER.

1,411,584. Specification of Letters Patent. Patented Apr. 4, 1922.

Application filed August 10, 1921. Serial No. 491,158.

*To all whom it may concern:*

Be it known that I, JOHN W. PETERS, a citizen of the United States, residing at Roslyn, in the county of Nassau and State of New York, have invented certain new and useful Improvements in Lawn Mowers, of which the following is a disclosure.

My invention relates more particularly to means for supplying power to a mower of the type disclosed in my application Serial No. 449,258 filed March 2, 1921. In that application I have disclosed an electrically propelled lawn mower supplied with current through a flexible cable secured at one end to a spring retracted reel mounted on the mower and at the other end to any available source of supply. I have discovered that the utility of this type of machine can be greatly increased by providing an improved arrangement for supplying current of the kind shown in the accompanying drawing. In this drawing—

Fig. 1 shows the mower moving under its own power from its place of storage to the lawn where it is to be used, and, Fig. 2 shows the mower in use.

Referring in detail to the drawing, the mower 1 is of the type described in my said application and comprises a reel 2 of the spring retracted type adapted to carry from 50 to 100 feet of cable 3. This cable 3 is connected to a cable 4 which latter is connected at one end to any available socket as at 5, and at the other end to a reel 6 mounted on a short pole 7. The pole 7 is adapted to be mounted either in a socket 8 on the machine or in any one of a number of sockets 9 on the lawn to be mowed. In moving the mower from place to place as from the place of storage to the lawn, the pole is mounted on the mower and the reel 6 which is preferably hand operated, is placed so that the handle 10 is in easy reach of the operator. The sockets 9 are driven in the ground at any convenient places and the pole is transferred from the machine to the desired socket when it is desired to cut grass. If desired the socket 8 may be omitted and the pole and annexed reel moved from place to place by hand.

Having now described my invention, what I claim is:

1. The combination with an electrically propelled lawn mower of a system of current supply comprising a pole adapted to be removably secured in position on the lawn, a cable extending from a source of current supply to the pole and a second cable extending from the top of the pole to the mower.

2. The combination with an electrically propelled lawn mower of a system of current supply comprising a pole adapted to be removably secured in position on the lawn and to be moved from place to place, a reel on the pole, a power cable extending from a source of supply to the reel on the pole, a reel on the mower and a second cable extending from the reel on the mower to the top of the pole and connected to the first mentioned cable.

3. The combination with an electrically propelled lawn mower of a system of current supply comprising a pole, means for detachably securing the pole either to the mower or to a desired position on the lawn, a cable extending from a source of current supply to the pole and a second spring retracted cable extending from the mower to the pole.

JOHN W. PETERS.